June 19, 1945.　　　C. F. CARLSTROM　　　2,378,684
LOCK NUT
Filed Oct. 28, 1944
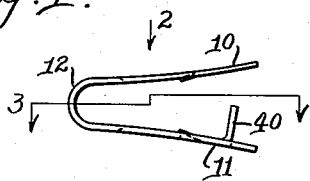
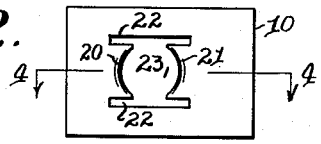
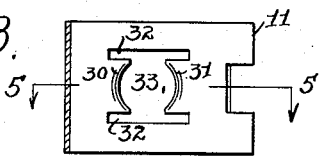
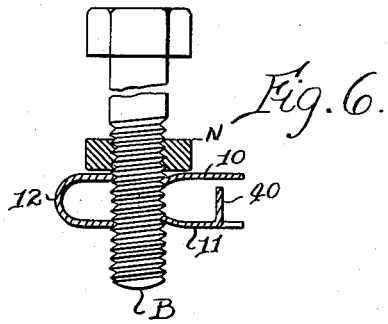
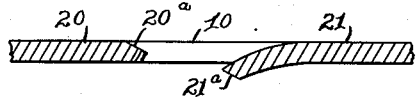
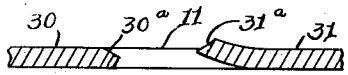
INVENTOR.
Carl F. Carlstrom.
BY Chas. T. Hawley
ATTY.

Patented June 19, 1945

2,378,684

UNITED STATES PATENT OFFICE 2,378,684

LOCK NUT

Carl F. Carlstrom, Worcester, Mass., assignor to Worcester Stamped Metal Company, Worcester, Mass., a corporation of Massachusetts Application October 28, 1944, Serial No. 560,801

1 Claim. (Cl. 85—36)

This invention relates to a lock nut which may be used on a bolt or screw by itself, or in association with a standard type nut.

It is the general object of my invention to provide a lock nut which will firmly grip and hold on a bolt or screw but which may be easily released and removed when so desired.

A further object is to provide a spring-type double lock nut which is under spring tension when in locking position but which is releasable by applying manual pressure to overcome the spring tension.

I also provide a U-shaped double-spring type of lock nut, the parts of which are displaced from normal free position when in use, and said parts being further displaceable in the same direction to release the locking grip.

My invention further relates to arrangements and combinations of parts which will be hereinafter described and more particularly pointed out in the appended claim.

A preferred form of the invention is shown in the drawing, in which

Fig. 1 is a side elevation of my improved lock nut;

Fig. 2 is a plan view, looking in the direction of the arrow 2 in Fig. 1;

Fig. 3 is a sectional plan view, taken along the line 3—3 in Fig. 1;

Fig. 4 is an enlarged partial sectional side elevation, taken along the line 4—4 in Fig. 2;

Fig. 5 is an enlarged partial sectional side elevation, taken along the line 5—5 in Fig. 3; and Fig. 6 is a sectional side elevation of the lock nut in operative position on a bolt.

Referring to the drawing, my improved lock nut comprises a single piece of spring steel which is rectangular in plan and substantially U-shaped in side elevation.

The nut comprises an upper portion 10 (Fig. 1) and a lower portion 11, joined by a semi-circular end portion 12.

The upper portion 10 has a pair of lugs 20 and 21 flanked by slots 22 and separated by a substantially circular opening 23. The inner edges of the lugs 20 and 21 are formed substantially as shown in Fig. 4, with the edge portion 20a substantially in line with the plane of the plate 10, and with the edge portion 21a substantially displaced downwardly. When the lock nut is in position on a bolt, as shown in Fig. 6, the edge 20a will be seated in one turn of the thread groove and the edge 21a will be seated in the next adjacent or lower groove.

Similarly, the lower plate 11 is provided with lugs 30 and 31 flanked by slots 32 and separated by a substantially circular opening 33. The edge portion 30a of the lug 30 is substantially in line with the plane of the plate 11, and the edge portion 31a of the lug 31 is substantially displaced upwardly, all as clearly shown in Fig. 5. When the lock nut is in operative position, the edges 30a and 31a engage the same turn of the thread groove, as also shown in Fig. 6.

A portion of the plate 11 is slitted and bent upward to provide a stop or spacer 40. In its normal or free position, the plates 10 and 11 are substantially spread apart, as clearly shown in Fig. 1.

When the lock nut is to be put in use, the plates 10 and 11 are pressed manually into substantially parallel position, with the plate 10 engaging the stop or spacer 40. A bolt or screw B may then be easily threaded through the openings 23 and 33 in the plates 10 and 11, and the threads of the bolt will be engaged as shown in Fig. 6.

When the manual pressure is released, the plates 10 and 11 will tend to separate slightly, assuming the locking position shown in Fig. 6 and in which position the bolt is firmly gripped and the nut is firmly locked thereto. If it is thereafter desired to release the lock nut, the plates 10 and 11 may be manually forced together until the plate 10 again engages the stop 40, in which position the lock nut may be easily turned on the bolt B.

It will be obvious that the amount of offset or displacement of the edge portions 21a and 31a out of the planes of the plates 10 and 11 will depend on the pitch of the thread on the bolt B and will be increased or decreased for coarser or finer pitch respectively.

As previously stated, my improved lock nut is effective when used by itself but is even more effective when used in association with a standard type nut N (Fig. 6). The entire lock nut structure comprises a single piece of spring steel and may be easily and economically manufactured.

Having thus described by invention and the advantages thereof, I do not wish to be limited to the details herein disclosed, otherwise than as set forth in the claim, but what I claim is:

A lock nut formed from a U-shaped piece of spring steel having upper and lower perforated and substantially flat plates with opposed thread-engaging lugs, one lug only in each plate being displaced toward the other plate and the other lug in each plate lying in the plane of said plate, the two lugs in one plate engaging the same turn of thread groove in a screw on which the lock nut is in use, and the two lugs of the other plate oppositely engaging adjacent turns of said screw, whereby a secure locking grip is obtained.

CARL F. CARLSTROM.